United States Patent [19]

Dixon et al.

[11] Patent Number: 5,636,898
[45] Date of Patent: Jun. 10, 1997

[54] SEAT WITH RECLINE LINKAGE

[75] Inventors: Richard W. Dixon, Winston-Salem; Lane J. Moncourtois, Lexington, both of N.C.

[73] Assignee: Burns Aerospace Corporation, Winston-Salem, N.C.

[21] Appl. No.: 567,404

[22] Filed: Dec. 5, 1995

Related U.S. Application Data

[63] Continuation of Ser. No. 228,285, Apr. 15, 1994, abandoned.
[51] Int. Cl.$^6$ .............................. A47C 1/02; B60N 2/02
[52] U.S. Cl. ........................................ 297/316; 297/281
[58] Field of Search ............................. 297/83, 370, 316, 297/317, 342, 321, 322, 281

[56] References Cited

U.S. PATENT DOCUMENTS

| | | | |
|---|---|---|---|
| 2,433,521 | 12/1947 | Lorenz | 297/83 |
| 2,860,691 | 11/1958 | Caesar | 297/322 |
| 2,892,484 | 6/1959 | Barabas | 297/83 |
| 3,640,570 | 2/1972 | Karlsen | 297/316 |
| 4,226,473 | 10/1980 | Johnson | 297/83 |
| 5,064,244 | 11/1991 | Sproule | 297/83 |
| 5,108,148 | 4/1992 | Henke | 297/317 |

FOREIGN PATENT DOCUMENTS

3638231A1  5/1988  Germany ............... B60N 1/06

*Primary Examiner*—Peter M. Cuomo
*Assistant Examiner*—Anthony D. Barfield
*Attorney, Agent, or Firm*—Adams Law Firm, P.A.

[57] ABSTRACT

A reclining seat of the type characterized by having a seat back which reclines and a seat bottom which elevates, the improvement which comprises linkage means interconnecting the seat back and the seat bottom and providing a ratio of seat back movement to seat bottom movement of greater than 1 to 1. The pivot axis between the seat back and seat bottom resides on a lateral axis extending from one side of the seat to the opposite side of the seat through the anatomical hip joint region of a seat occupant, for permitting the seat back and seat bottom to move relative to each other about the same pivot axis as the seat occupant will move his or her legs relative to the torso.

6 Claims, 5 Drawing Sheets

SEAT WITH RECLINE LINKAGE

This application is a continuation application of U.S. Ser. No. 08/228,285, filed Apr. 15, 1994, abandoned.

TECHNICAL FIELD AND BACKGROUND OF THE INVENTION

This invention relates to a seat, particularly an aircraft passenger seat, which has a recline linkage which permits ergonomically correct movement of the seat for improved occupant comfort and convenience. A feature of the seat is the placement of the pivot axis of the seat at a level in the region of the hip joint of a typical occupant. Thus, the seat pivots in essentially the same manner and from the essentially the same point as the occupant. This provides greater comfort to the occupant, and prevents or minimizes dishevelment of clothing during travel caused by shirttails being pulled from trousers or skirts as the seat back pivots.

Conventional passenger seats recline in one of several ways. First, the seat bottom may remain stationary, usually at a slight angle, such as 5 degrees from the horizontal, while the seat back is permitted to recline. Such seats are common in "coach" cabins of passenger aircraft, as well as in short haul first class and business class cabins.

Second, the seat back and seat bottom may both pivot, but at the same rate. This has the effect of tilting the seat occupant back, but not allowing the occupant to "unbend" from a normal seating position into a more open and comfortable reclining position. Some office desk chairs use an arrangement similar to this.

As is apparent, if the seat bottom was not moved at all, movement of the seat back from the full upright position would eventually allow the occupant to fully recline once the seat back and seat bottom achieved positions in a similar plane. Such seats are sometimes used in very low density seating configurations, but typically the seat bottom is not moveable.

Ergonomic studies have established that as a seat occupant reclines, i.e., as the seat back moves from the full upright position, greater comfort is achieved if the hips and upper legs are supported, and the occupant is prevented from sliding forward on the seat bottom. This support can be provided by allowing the seat bottom to tilt upwardly as the seat back moves into the recline position. However, simply permitting the seat bottom to tilt upward at the same rate as the seat back reclines keeps the occupant in a close to right angle position. This position is uncomfortable if maintained for long periods of time.

The seat disclosed in this application establishes a ratio of seat back movement to seat bottom movement which enhances occupant comfort by permitting the occupant to unbend as the seat reclines, establishing a position in which the occupant is actually in more of a reclined position, as opposed to merely being tilted from the horizontal.

The seat permits also greater or lesser degrees of recline to be easily achieved by use of interchangeable link bars.

SUMMARY OF THE INVENTION

Therefore, it is an object of the invention to provide a seat which has a recline linkage which permits ergonomically correct movement of the seat for improved occupant comfort and convenience.

It is another object of the invention to provide a seat which has a seat back and a seat bottom which move at different relative rates.

It is another object of the invention to provide a seat in which the pivot axis of the seat is at a level in the region of the hip joint of a typical occupant.

It is another object of the invention to provide a seat in which the ratio of seat back to seat bottom movement can be changed by substituting a component of the linkage.

These and other objects of the present invention are achieved in the preferred embodiments disclosed below by providing in a reclining seat of the type characterized by having a seat back which reclines and a seat bottom which elevates, the improvement which comprises linkage means interconnecting the seat back and the seat bottom and providing a ratio of seat back movement to seat bottom movement of greater than 1 to 1.

According to one preferred embodiment of the invention, the linkage means includes a pivot axis interconnecting the seat back to the seat bottom for permitting relative movement between the seat back and the seat bottom about the pivot axis and a link bar having first and second pivot connections in spaced-apart relation on opposing ends thereof and pivotally connected to the seat back and the seat frame at mutually spaced-apart relation from the pivot axis and interconnecting the seat back and the seat bottom together for unison movement.

According to another preferred embodiment of the invention, the pivot axis resides on a lateral axis extending from one side of the seat to the opposite side of the seat through the anatomical hip joint region of a seat occupant, for permitting the seat back and seat frame to move relative to each other about the same pivot axis as the seat occupant will move his or her legs relative to the torso.

According to yet another preferred embodiment of the invention, the seat bottom pivots from a full upright position to a full recline position through a range of 5 degrees to 20 degrees and the seat back simultaneously pivots from a full upright position to a full recline position through a range of 15 degrees to 40 degrees.

According to yet another preferred embodiment of the invention, the seat bottom pivots from a full upright position to a full recline position through a range of 5 degrees to 20 degrees, and the seat back simultaneously pivots from a full upright position to a full recline position through a range of 15 degrees to 50 degrees.

Preferably, the seat back includes a lower end and the seat bottom includes an inner end, the lower end of the seat back and the inner end of the seat bottom residing adjacent each other. The seat also includes a pivot axis interconnecting the seat back to the seat bottom for permitting relative movement between the seat back and the seat bottom about the pivot axis. The pivot axis resides on a lateral axis extending from one side of the seat to the opposite side of the seat through the anatomical hip joint region of a seat occupant for permitting the seat back and seat bottom to move relative to each other about the same pivot axis as the seat occupant. The seat also includes a link bar having first and second pivot connections in spaced-apart relation on opposing ends thereof and pivotally connected to the seat back and the seat bottom at mutually spaced-apart relation from the pivot axis and interconnecting the seat back and the seat bottom together for unison movement.

According to one preferred embodiment of the invention, the seat comprises a aircraft passenger seat and includes frame means for supporting the seat on the deck of an aircraft.

According to another preferred embodiment of the invention, linkage means are provided on opposite sides of the seat for controlling the ratio of seat back movement to seat bottom movement from both sides of the seat.

According to one preferred embodiment of the invention, the linkage means includes at least first and second interchangeable link bars for determining the ratio of seat back movement to seat bottom movement, the first link bar, when installed in the seat providing a ratio of seat back movement to seat bottom movement different from the ratio of seat back movement to seat bottom movement provided by the second link bar when the second link bar is installed in the seat.

According to another preferred embodiment of the invention, a plurality of the seats are connected together side-by-side to form a seating unit.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
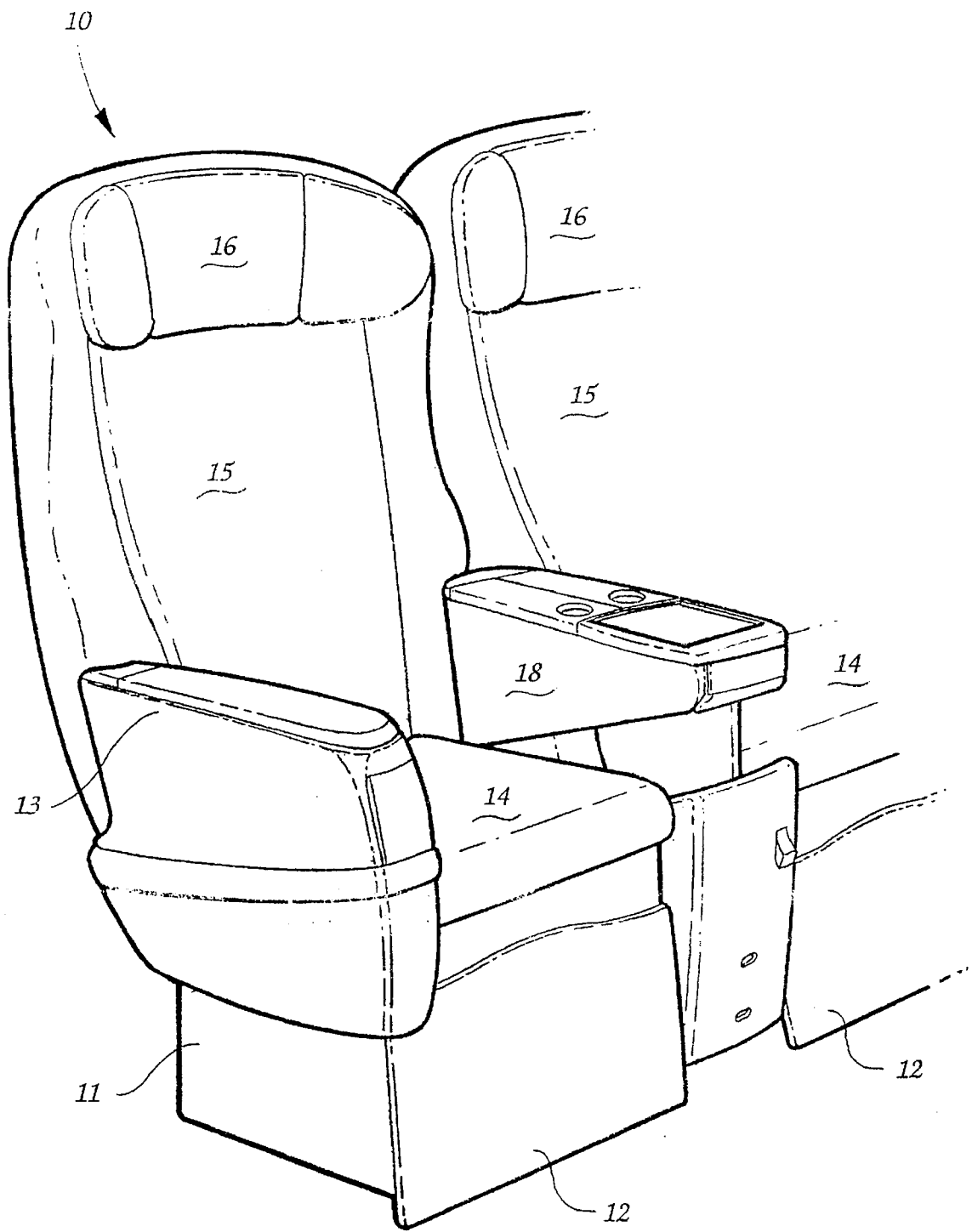
FIG. 1 is a perspective view of an aircraft seat according to an embodiment of the invention.

Referring now specifically to the drawings, a seat 10 according to the present invention is illustrated in FIG. 1 and shown generally at reference numeral 10. Seat 10 is an aircraft seat, and in the particular embodiment shown in FIG. 1, is a first class/business class seat intended for long haul first class/business class air travel. Seat 10 includes a seat pedestal which encloses operating elements of the seat and locking mechanisms which secure the seat to the aircraft deck. Seat 10 also includes a leg rest 12, an outboard armrest 13, a seat bottom cushion 14 supported by a seat bottom (not shown), a seat back cushion 15 supported by a seat back (not shown), and a head rest 16. In the embodiment shown in FIG. 1, two seats 10 are shown in a typical side-by-side first class configuration separated by a single center console 18 which is shared by both seats 10 and includes an armrest and controls for the entertainment system.

Figure 2:
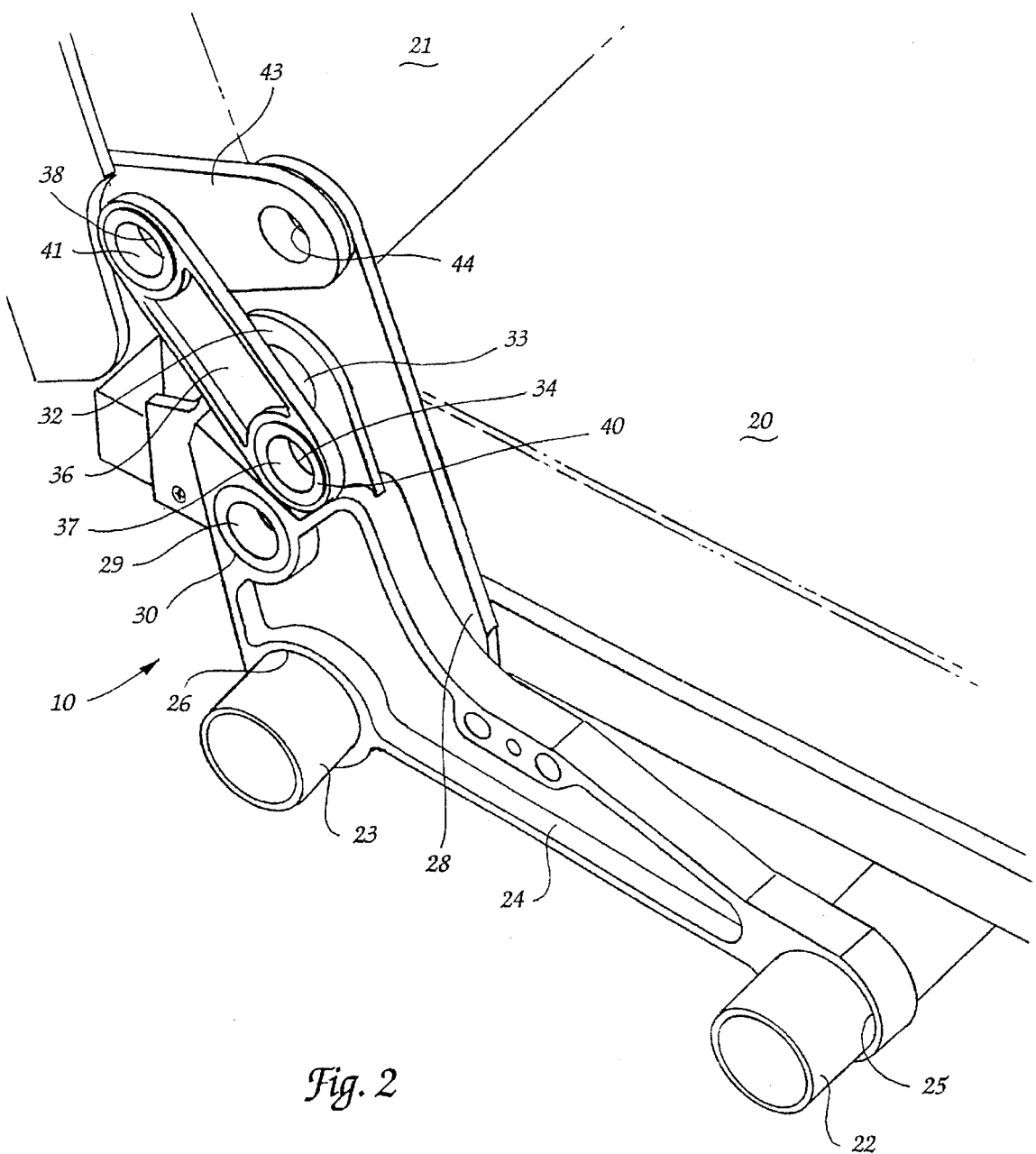
FIG. 2 is a fragmentary perspective view of a seat back and seat bottom linkage according to an embodiment of the invention.

Referring now to FIG. 2, a portion of seat 10 is shown with seat cushions 14 and 15 removed to expose the supporting seat bottom 20 and the supporting seat back 21. Seat 10 is supported on a pair of laterally-extending support tubes 22 and 23 by a right-hand seat frame 24. Seat frame 24 includes fore and aft integrally-formed tube collars 25 and 26 into which tubes 22 and 23 are positioned and locked into place. This construction is conventional.

Seat 10 includes a left-hand seat frame (not shown) on the left-hand side of the seat 10, which is constructed and functions identically with right-hand seat frame 24 and will not be discussed specifically, it being understood that the disclosure of this application relates to both left and right-hand sides of the seat 10.

Seat frame 24 includes linkage means, including a seat bottom pivot member 28 which is mounted to the side edge of the seat bottom 20 and which is pivotally-mounted to seat frame 24. Attachment between the seat bottom pivot member 28 and the seat bottom is through a tubular pivot bushing 29 mounted on the seat bottom pivot member 28 and extending through an annular collar 30 formed in the aft section of the seat frame 24. The outer surface of the pivot bushing 29 forms a bearing surface which permits pivoting relative movement between the stationary seat frame 24 and the pivoting seat bottom 20.

A pivot bracket 32 is a part of the seat frame 24 and is positioned above the area of the pivot bushing 29. Pivot bracket 32 has two annular openings 33 and 34, either of which can form one attachment point for a link bar 36. Link bar 36 includes annular openings 37 and 38 on opposite ends. The end of the link bar 36 having opening 37 is pivotally mounted on the pivot bracket 32 by an tubular pivot bushing 40. Pivot bushing 40 is secured with washers and a snap ring (not shown). The end of the link bar 36 having the opening 38 is secured by a tubular pivot bushing 41 to a seat back bracket 43 which is carried by the seat back 21.

Seat back bracket 43 is also mounted for pivotal movement to the seat bottom pivot member 28 by a pivot bushing 44. The structure described above results in a four-bar linkage which permits different rates of movement of the seat bottom 20 and the seat back 21.

Figure 3:
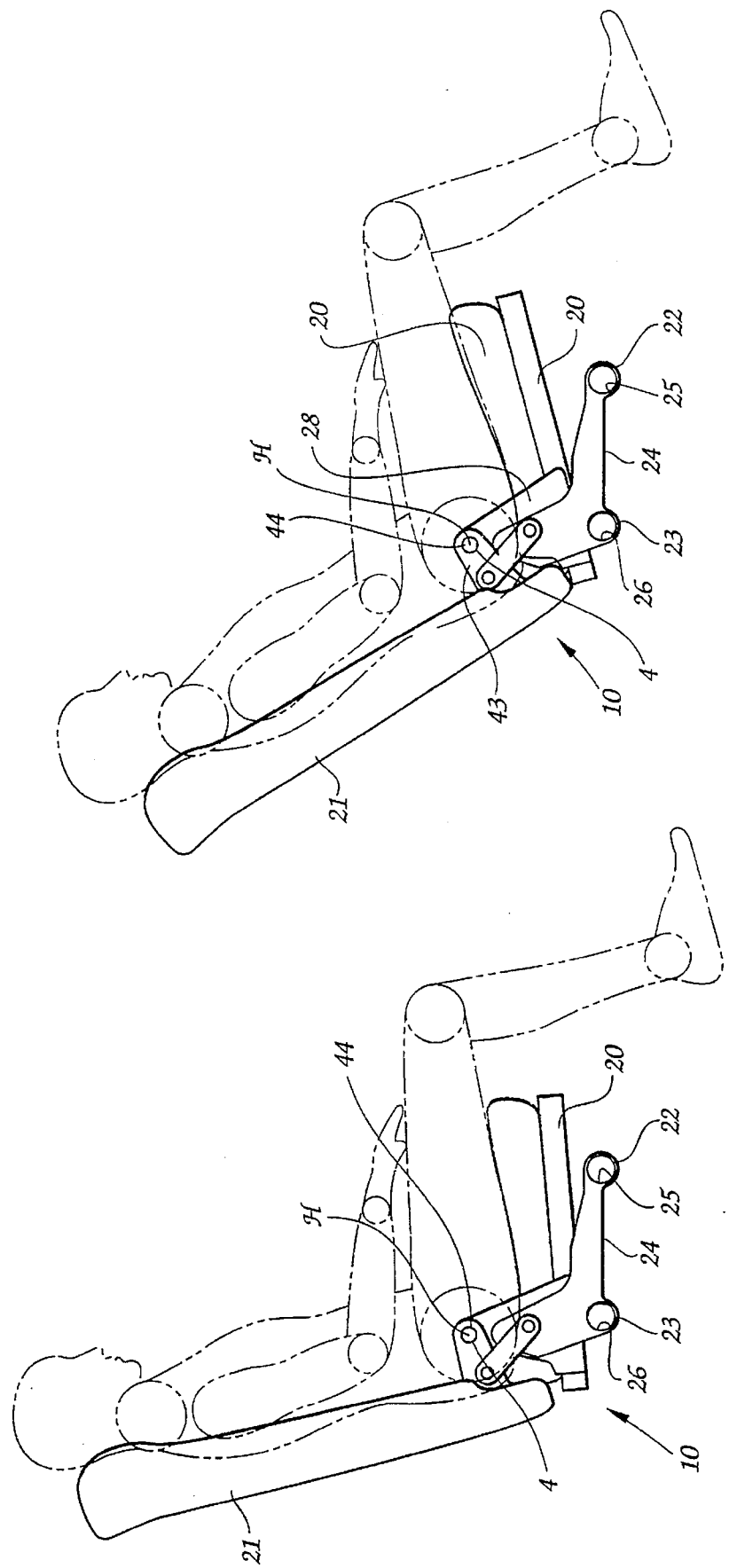
FIG. 3 is a side elevation, with parts broken away, of an aircraft seat according to an embodiment of the invention.

The linkage means described above is shown in the context of the complete seat 10 in FIG. 3. As described above, seat back 21 pivots about the axis defined by the pivot bushing 44. This pivot bushing 44 resides on a lateral axis extending between the right-hand and left-hand sides of the seat 10 through the anatomical hip joint region of a seat occupant, designated as "H" in FIG. 3. This permits the seat back 21 and seat bottom 20 to move relative to each other about the same pivot axis as the seat occupant will move his or her torso and legs. The use of the term "same pivot axis" is, of course, used in an approximate sense, since the hip joint of different occupants will not all be in the same axis. However, there is relatively little variation from individual to individual and, in any event, positioning the pivot point of the seat back relative to the seat bottom substantially above the seat bottom level and forward of the seat back level in the area of the occupant will always result in a pivot axis which is closer to the hip joint, and therefore more comfortable, than if the pivot were at the intersection point of the seat back and seat bottom, as is conventional. The movement of the pivot bushing 44 slightly aft during seat recline does not effect the position of the pivot bushing 44 relative to the axis "H".

As is clear in FIG. 3, the pivot axis remains the same as the seat is moved from the full upright position (left-hand view) to the full reclined position (right-hand view).

Figure 4:
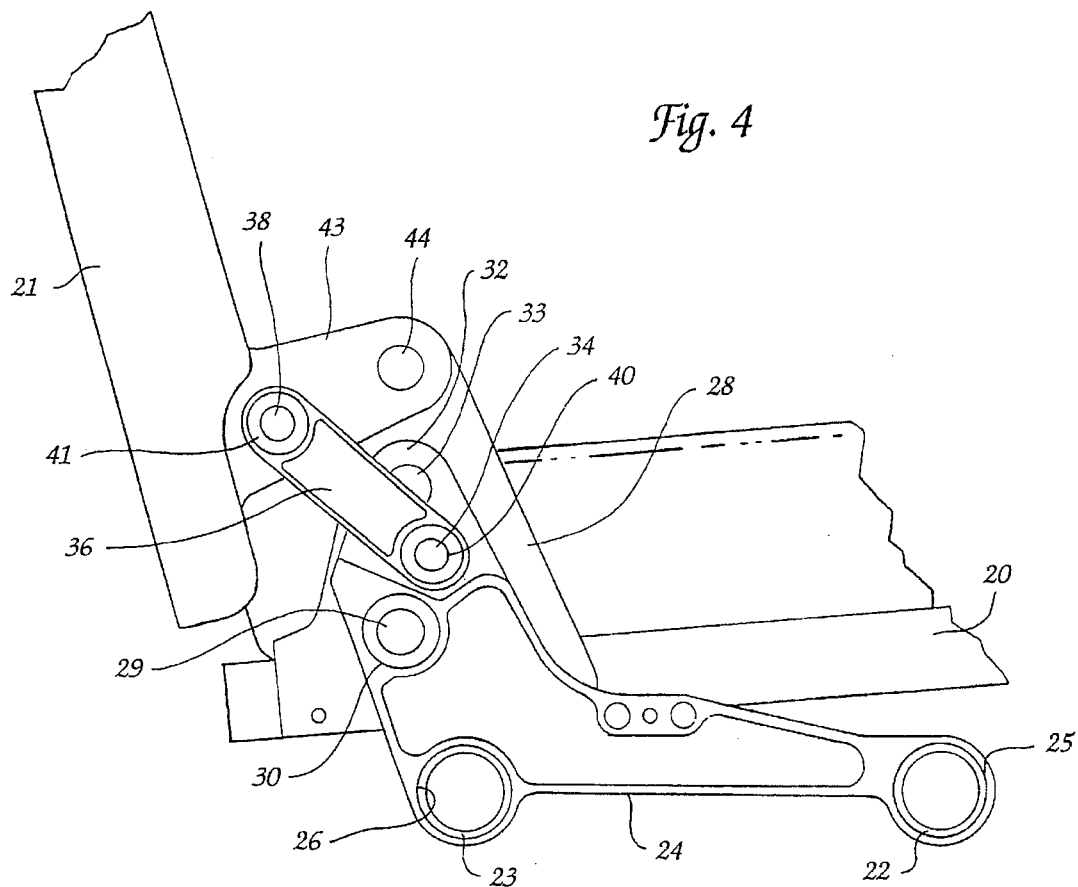
FIG. 4 is a side elevation of the seat back and seat bottom linkage shown in FIG. 3, in the full upright position.
Figure 5:
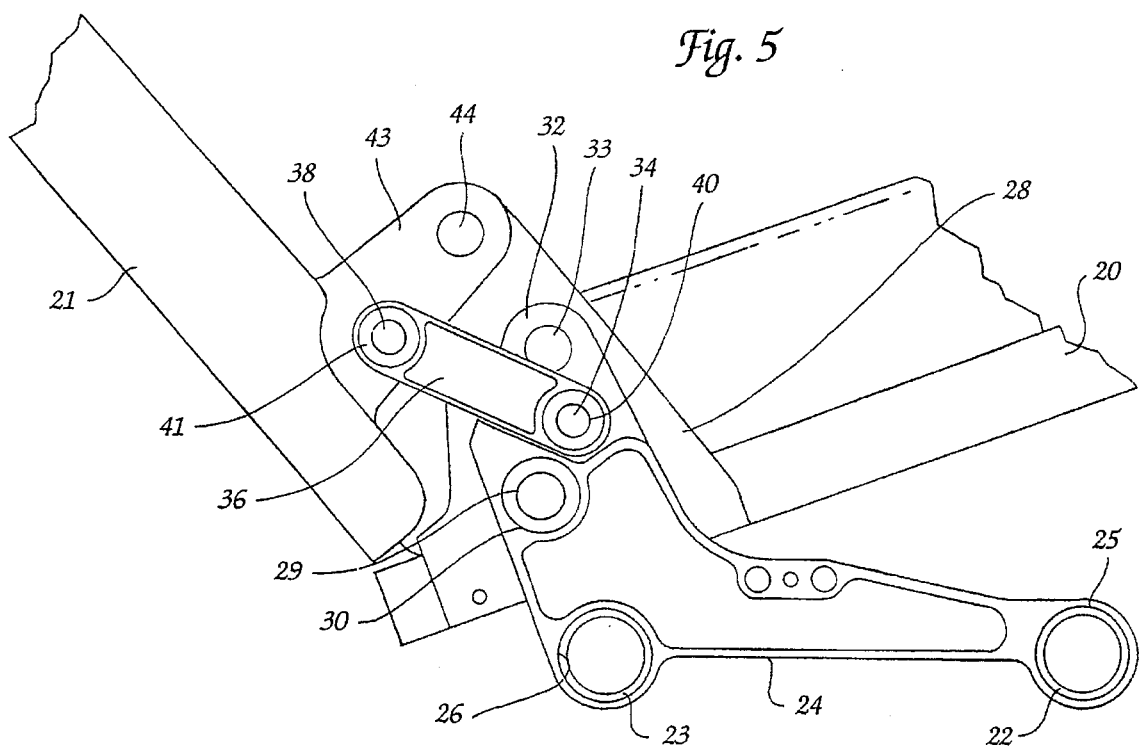
FIG. 5 is a side elevation of the seat back and seat bottom linkage shown in FIG. 3, in the fully reclined position.

Operation of the seat 10 is illustrated in FIGS. 4 and 5. FIG. 4 illustrates the seat 10 in the full upright position. The seat 10 is pitched at 40 inches between adjacent seats 10. In the full upright position, seat bottom 20 is positioned at a 5 degree angle above horizontal, and seat back 21 is positioned at a 15 degree angle from the vertical. By operating seat recline controls and exerting rearward pressure on the seat back 21, the seat bottom 20 progressively raises and seat back 21 progressively reclines. As is apparent, if seat bottom 20 and seat back 21 were rigidly connected, both would move at the same rate so that, for example, a 15 degree upward movement of the seat bottom 20 would result in a 15 degree rearward movement of seat back 21. This would mean that the occupant was tilted backwards, but without any opportunity to stretch out into a more open position with less bend at the waist.

However, the four bar linkage described above permits seat back 21 to tilt at a greater rate. As a result, seat back 21 reclines from 15 degrees to 40 degrees, a total of 25 degrees, while seat bottom 20 is raising from 5 degrees to 20 degrees, a total of 15 degrees. This results in a ratio of seat back to seat bottom movement of 1.67 to 1.

FIG. 5 illustrates seat 10 in the fully reclined position with seat bottom 20 raised to an angle of 20 degrees from the horizontal, and seat back 21 reclined to an angle of 40 degrees from the vertical. Fifteen degrees of movement of the seat back 21 is provided by counterclockwise movement of the seat bottom pivot member 28, which moves in unison with the seat bottom 20. An additional ten degrees of rearward movement of the seat back 21 is provided by the seat back bracket 43 which moves with the seat bottom pivot member 28 to which it is pivotally attached. The link bar 36 pivots from the position shown in FIG. 4 to the position shown in FIG. 5 through the addition of the movement of the seat back bracket 43 to the movement of the seat bottom pivot member 28. The link bar 36 controls the motion of the seat back bracket 43 and limits the pivotal movement of the seat back bracket 43 relative to the seat bottom pivot member 28 to 10 degrees at the fully reclined position shown in FIG. 5, and to a proportionally lesser degree of recline at positions intermediate the views shown in FIGS. 4 and 5.

Figure 6:
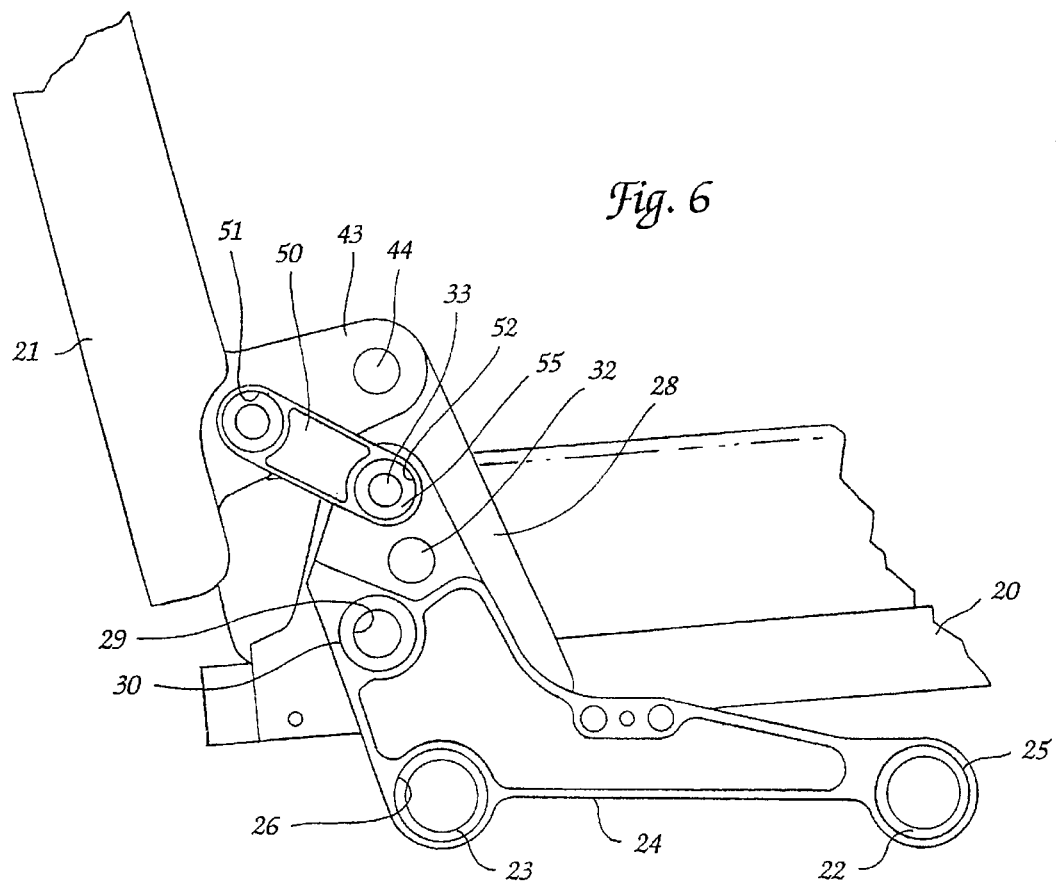
FIG. 6 is a side elevation of a seat back and seat bottom linkage shown with a shorter link bar in the full upright position.
Figure 7:
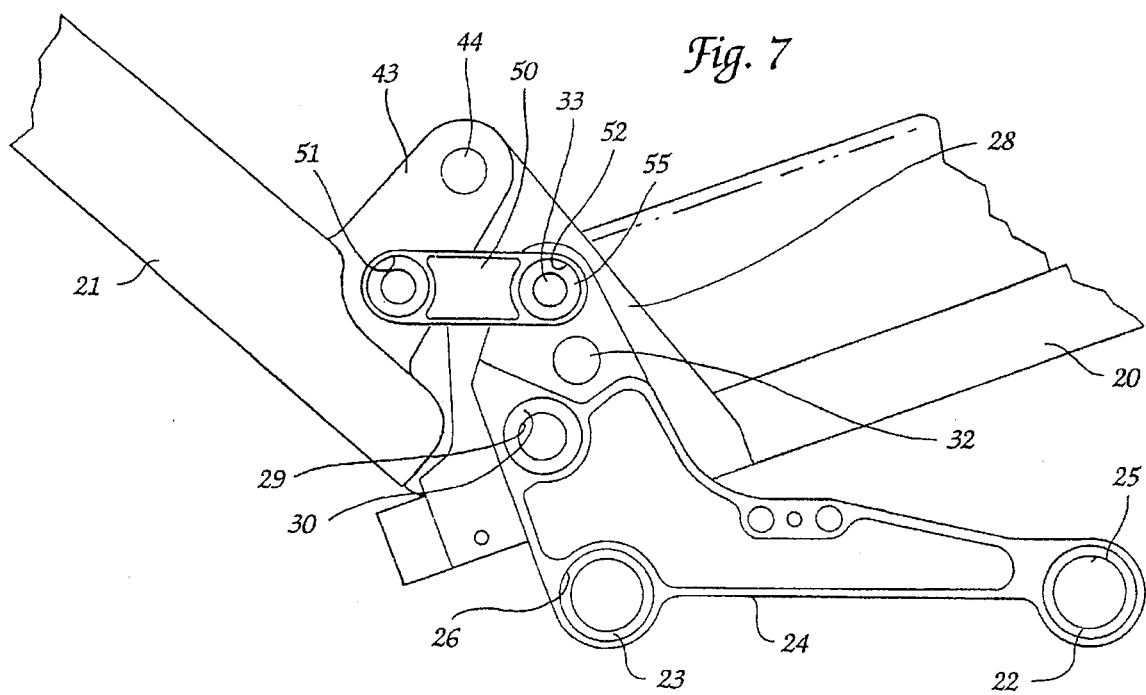
FIG. 7 is a side elevation of the seat back and seat bottom linkage shown in FIG. 6, in the fully reclined position.

Referring now to FIGS. 6 and 7, the linkage means is shown reconfigured for a 55 inch pitch seat. This is accomplished by removing link bar 36 and replacing it with a shorter link bar 50. Link bar 50 includes annular openings 51 and 52 on opposite ends. The end of the link bar 50 having opening 52 is pivotally mounted in the opening 33 on the pivot bracket 32 by an tubular pivot bushing 55. Pivot bushing 55 is secured with washers and a snap ring (not shown). The end of the link bar 50 having the opening 51 is secured by a tubular pivot bushing 56 to seat back bracket 43 through opening 38, as is the link bar 36.

In summary, one end of the link bar 50 is positioned in the same opening as is link bar 36 (opening 38) while the other is repositioned upwardly on the pivot bracket 32 from opening 34 into the opening 33. The shorter link bar 50 and the increased radius between pivot bushing 29 and the opening 33 has the effect of increasing the degrees of arc the seat back 21 is permitted to move in addition to the movement of the seat bottom 20. Thus, in the views shown in FIGS. 6 and 7, the seat bottom 20 moves from a 5 degree angle above the horizontal (FIG. 6) to 20 degrees above the horizontal (FIG. 7), just as in FIGS. 4 and 5. However, the seat back 21 moves from the same 15 degree angle from the vertical (FIG. 6) to 50 degrees from the vertical (FIG. 7). This results in a ratio of seat back to seat bottom movement of 2.33 to 1.

A seat with a recline linkage is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. In a reclining seat of the type having a seat back (21) which reclines in an angular direction from the vertical and a seat bottom (20) carried on a stationary seat frame (24), which seat bottom (20) elevates in an angular direction from the horizontal, and has an occupant area defined upwardly of the seat bottom (20) and forward of the seat back (21), the improvement comprising a linkage assembly interconnecting the seat back (21) and the seat bottom (20) and providing a ratio of seat back movement to seat bottom movement of greater than one-to-one, whereby the seat back (21) reclines at a rate greater than the seat bottom (20) elevates; said linkage assembly comprising:

(a) a seat bottom pivot member (28) pivotally interconnecting the seat bottom (20) and the stationary seat frame (24) for permitting pivotal movement of the seat bottom (20) about the seat bottom pivot member (28) relative to the stationary seat frame (24);

(b) a seat back pivot member (43) carried on said seat back (21) and pivotally connected to said seat bottom pivot member (28) at a hip-joint pivot connection (44) for pivotal movement of said seat back (21) relative to said seat bottom (20);

(c) said hip-joint pivot connection (44) residing on a lateral axis ("H") extending from one side of the seat to the opposite side of the seat upwardly from the seat bottom (20) and forwardly of the seat back (21) in the seat occupant area, and through an area adapted to lie in an anatomical hip joint region of the seat occupant for permitting the seat back (21) to move about generally a pivot axis adapted to lie at a junction of the torso and the legs of the seat occupant; and (d) a link bar (36) having first and second pivot connections (40, 41) in spaced-apart relation on opposing ends thereof and pivotally connected by said first and second pivot connections (40, 41) to the stationary seat frame (24) and the seat back pivot member (43), respectively, said link bar (36) interconnecting the seat back (21) and the seat bottom (20) together for movement of the seat back (21) at an angular rate greater than that of the seat bottom (20).

2. In a reclining seat according to claim 1, wherein said linkage assembly includes at least first and second interchangeable link bars for determining the ratio of seat back movement to seat bottom movement, said first link bar having a predetermined length such that, when said first link bar is installed in said seat a predetermined ratio of seat back movement to seat bottom movement is provided; and said second link bar having a length less than the length of said first link bar such that, when said second link bar is installed in said seat, the ratio of seat back movement to seat bottom movement is proportionally greater than the ratio of seat back to seat bottom movement provided by said first link bar.

3. In a reclining seat according to claims 1 or 2, wherein the seat bottom pivots from a full upright position to a full recline position through a range of 5 degrees to 20 degrees, and the seat back simultaneously pivots from a full upright position to a full recline position through a range of 15 degrees to 40 degrees.

4. In a reclining seat according to claims 1 or 2, wherein the seat bottom pivots from a full upright position to a full recline position through a range of 5 degrees to 20 degrees, and the seat back simultaneously pivots from a full upright position to a full recline position through a range of 15 degrees to 50 degrees.

5. In a reclining seat according to claim 1 or 2, wherein said seat comprises a aircraft passenger seat.

6. In a reclining seat according to claim 5, wherein a plurality of said seats are connected together side-by-side to form a seating unit.

* * * * *